(12) United States Patent
Leisch

(10) Patent No.: US 7,762,586 B2
(45) Date of Patent: Jul. 27, 2010

(54) MOTORCYCLE FRAME NECK COVER

(75) Inventor: Matthew N. Leisch, Chisago City, MN (US)

(73) Assignee: Kuryakyn Holdings, Inc., Somerset, WI (US)

( * ) Notice: Subject to any disclaimer, the term of this patent is extended or adjusted under 35 U.S.C. 154(b) by 431 days.

(21) Appl. No.: 12/009,771

(22) Filed: Jan. 22, 2008

(65) Prior Publication Data

US 2009/0184507 A1 Jul. 23, 2009

(51) Int. Cl.
  *B60J 11/00* (2006.01)
  *B60R 19/54* (2006.01)
  *B62D 61/02* (2006.01)

(52) U.S. Cl. ............... 280/770; 280/762; 280/288.3; 280/288.4; 180/219

(58) Field of Classification Search ........ 280/762, 280/770, 280.4, 288.2, 288.3, 288.4; 180/218, 180/219; 296/78.1, 95.1; 293/105; D12/114, D12/118
See application file for complete search history.

(56) References Cited

U.S. PATENT DOCUMENTS

| | | | | | |
|---|---|---|---|---|---|
| 3,439,950 | A | * | 4/1969 | Kunevicius | ............... 293/128 |
| 4,714,061 | A | * | 12/1987 | Nakayama et al. | ...... 123/195 R |
| 4,871,205 | A | * | 10/1989 | Bray | ............... 293/128 |
| 5,511,822 | A | * | 4/1996 | Wolanski | ............... 280/770 |
| D376,123 | S | * | 12/1996 | Camfield | ............... D12/114 |
| D376,775 | S | * | 12/1996 | Fang | ............... D12/117 |
| D405,032 | S | * | 2/1999 | Klarfeld | ............... D12/117 |
| D423,415 | S | * | 4/2000 | McKay | ............... D12/114 |
| 7,552,788 | B2 | * | 6/2009 | Satake | ............... 180/68.1 |
| 2005/0279556 | A1 | * | 12/2005 | Konno et al. | ............... 180/219 |

OTHER PUBLICATIONS

Kuryakyn Holdings, Inc. 2000 Catalog (2 pgs.) (Cover page & p. 66).
Kuryakyn Holdings, Inc. 2004 Catalog (2 pgs.) (Cover page & p. 73).
Kuryakyn Holdings, Inc. Harley Catalog ( 2pgs.) (Cover page & p. 83).
Kuryakyn Holdings, Inc. Catalog for Harleys 2006 (2 pgs.) (Cover page & p. 89.
Kuryakyn Holdings, Inc. Catalog for Gold Wing & Metric Cruisers 2006 (2 pgs.) (Cover page & p. 63).

* cited by examiner

*Primary Examiner*—Lesley Morris
*Assistant Examiner*—John R Olszewski
(74) *Attorney, Agent, or Firm*—Dicke, Billig & Czaha, PLLC

(57) ABSTRACT

A motorcycle frame neck cover includes a lower semi-tubular portion that substantially surrounds an outer visible half of a motorcycle frame leg and an upper portion that substantially covers a planar outer surface of a generally rectangular tubular frame member that mounts the front fork of the motorcycle. One or more resilient strips are mounted to an outer surface of the upper cover portion in an area of potential contact by a front fork shroud.

2 Claims, 4 Drawing Sheets

MOTORCYCLE FRAME NECK COVER

BACKGROUND

The present invention generally relates to custom accessories for a motor vehicle, such as a motorcycle. In particular, the present invention relates to a cover accessory for a motorcycle frame neck.

Consumers have shown a strong interest in customizing their motorcycles by adding accessories to enhance the appearance of the motorcycle. The neck region of a motorcycle frame is exposed to view. The frame members forming the neck region are structural tubular metal pieces that are welded together and painted. One or more unsightly wire harnesses are secured to the frame neck and routed to the motorcycle front end to deliver power to the electrical components on the handlebars and front fork assembly. Covers have been devised to mount over the neck region to improve the appearance of the motorcycle. The addition of a neck cover over the neck region of the motorcycle frame has been found to cause an interference with decorative shrouds covering the fork tubes of the front fork assembly when the front wheel is turned completely to either the left or the right, such as occurs to operate a front fork lock on many motorcycles. Repeated contact between the front fork tube shrouds and the neck cover can cause denting and/or chipping of the chrome plating on the neck cover and/or the fork tube shrouds. There is a need to provide a motorcycle frame neck cover that avoids damage to and/or being damaged by the front fork tube shrouds.

SUMMARY OF THE INVENTION

The present invention is a cover for a motorcycle frame neck region which typically has a generally rectangular tubular frame member configured to mount a fork assembly and first and second frame legs connected to and extending downwardly from the generally rectangular tubular frame member. The cover comprises first and second cover portion. The first cover portion is semi-tubular and is configured to partially surround one of the first and second frame legs. The first cover portion has a first end configured for connection to the first frame leg and a second end. A second generally planar portion is connected to and extends from the second end of the first portion. The second portion is configured for connection to the generally rectangular tubular frame member. The second portion substantially covers an outer surface of the rectangular tubular frame member and has an inner surface and an outer surface. A portion of the second cover portion comprises one or more resilient strips along outer surface. The resilient strips extend above the outer surface.

DETAILED DESCRIPTION

Figure 1:
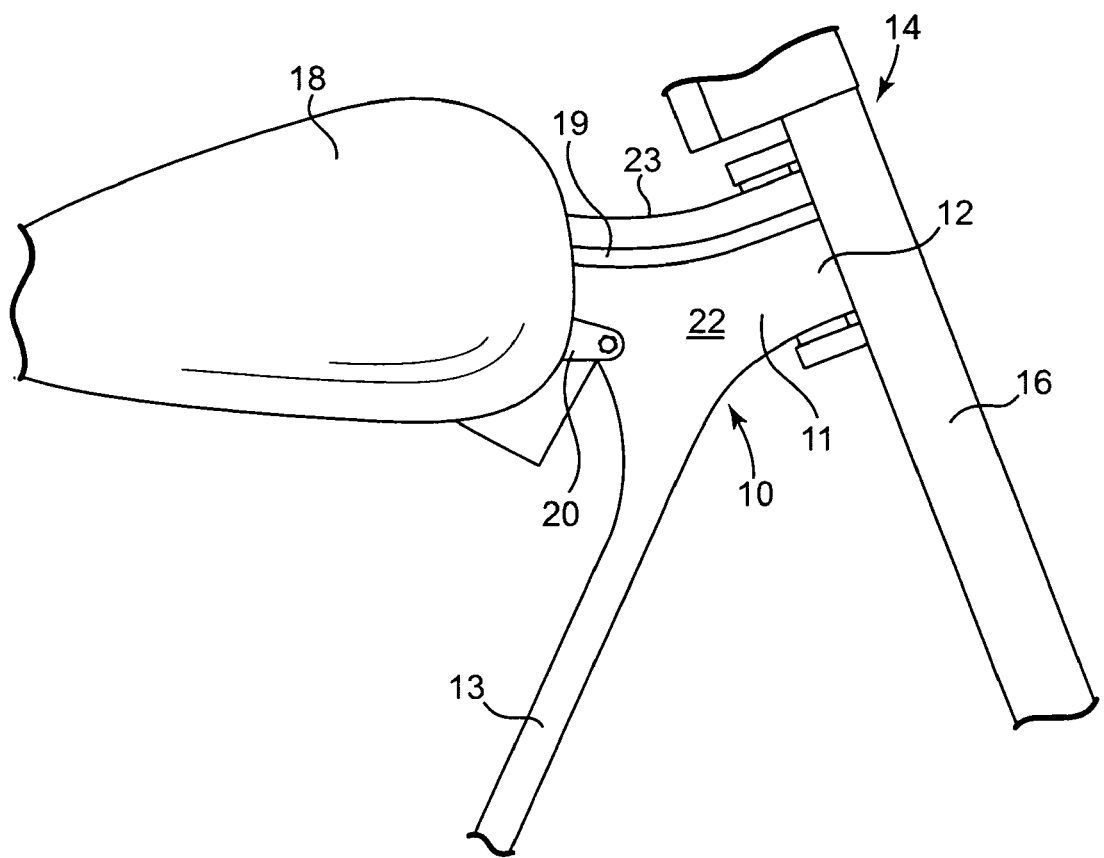
FIG. 1 is a partial side view of a right side of a motorcycle frame neck.

FIG. 1 is a partial side view of a right side of a motorcycle frame neck 10, a front end 12 of which pivotally mounts a front fork assembly 14. Frame neck 10 is comprised of a generally rectangular tubular frame member 11 which is welded to a pair of left and right generally circular tubular frame members 13. Front fork assembly 14 comprises left and right fork tubes 16 which mount a front wheel at a lower end and handlebars at an upper end. Fork tubes 16 may comprise a decorative shroud (not shown) at the upper extent of the fork tubes. A gas tank 18 mounts on an upper frame member and includes a tab 20 that is secured by a bolt to a threaded mount at a rear end of the neck 10. One or more wire harnesses 19 typically extend along an outer surface 22 of neck 10 adjacent to the upper end 23 of neck 10.

Figure 2:
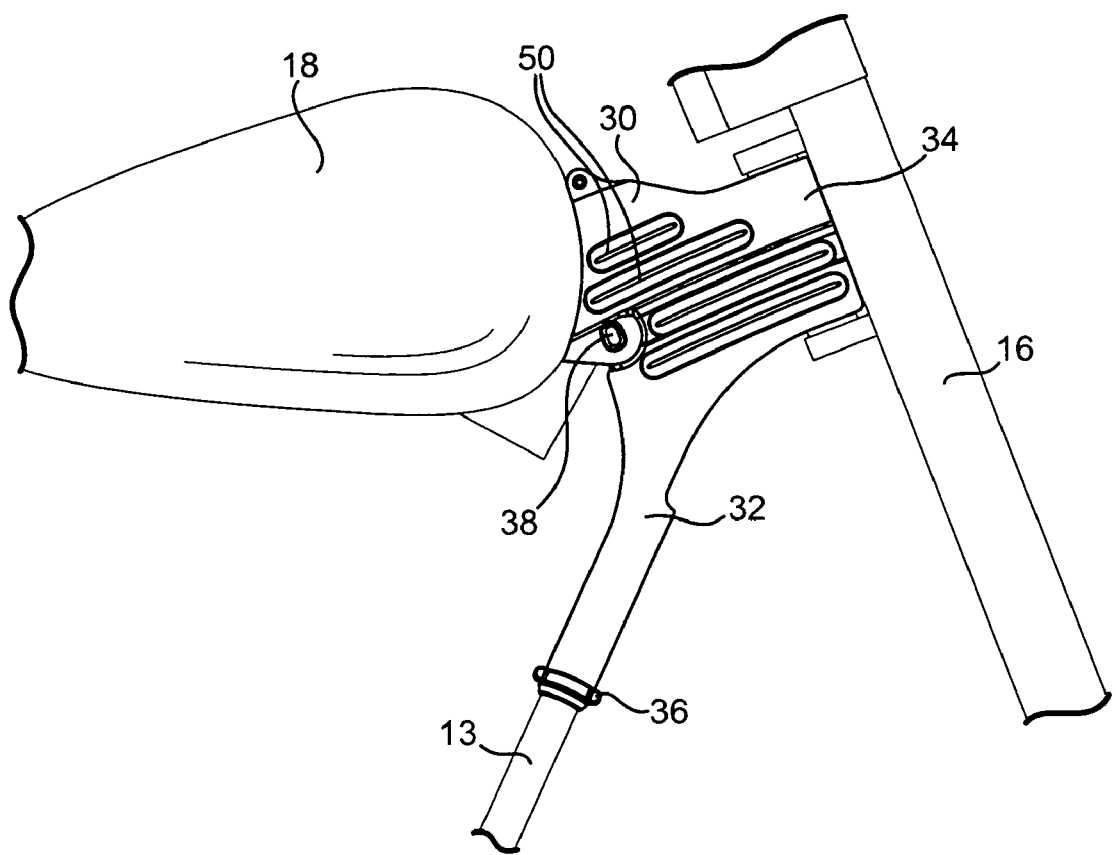
FIG. 2 is side view of a neck cover of the present invention connected to the frame neck of FIG. 1.

FIG. 2 is side view of one embodiment of a neck cover 30 of the present invention connected to the frame neck 10 of FIG. 1. Neck cover 30 includes a lower portion 32 and an upper portion 34. Lower portion 32 is semi-tubular in shape and partially surrounds the outer visible half of an upper end of frame member 13. Lower portion 32 is secured to frame member 13 with a clamp 36 located at a lower end of portion 32. Upper portion 34 covers a generally planar outer surface 22 of frame member 11. Upper portion 34 is configured with a mounting hole 38 that aligns with the threaded mount for tab 20 of gas tank 18. Upper portion 34 is secured to frame member 11 by removing the stock bolt securing tab 20, positioning the upper portion 34 over frame member 11 and threading a bolt through hole 38 and into the threaded mount for tab 20. In an alternate embodiment, lower portion 32 may be eliminated and neck cover 30 may be comprised solely of upper portion 34. An area of the upper portion 34 that has been found to interfere with the decorative shroud mounted over the upper fork tubes 16 is fitted with one or more resilient strips 50 in a manner to be described more fully.

Figure 3:
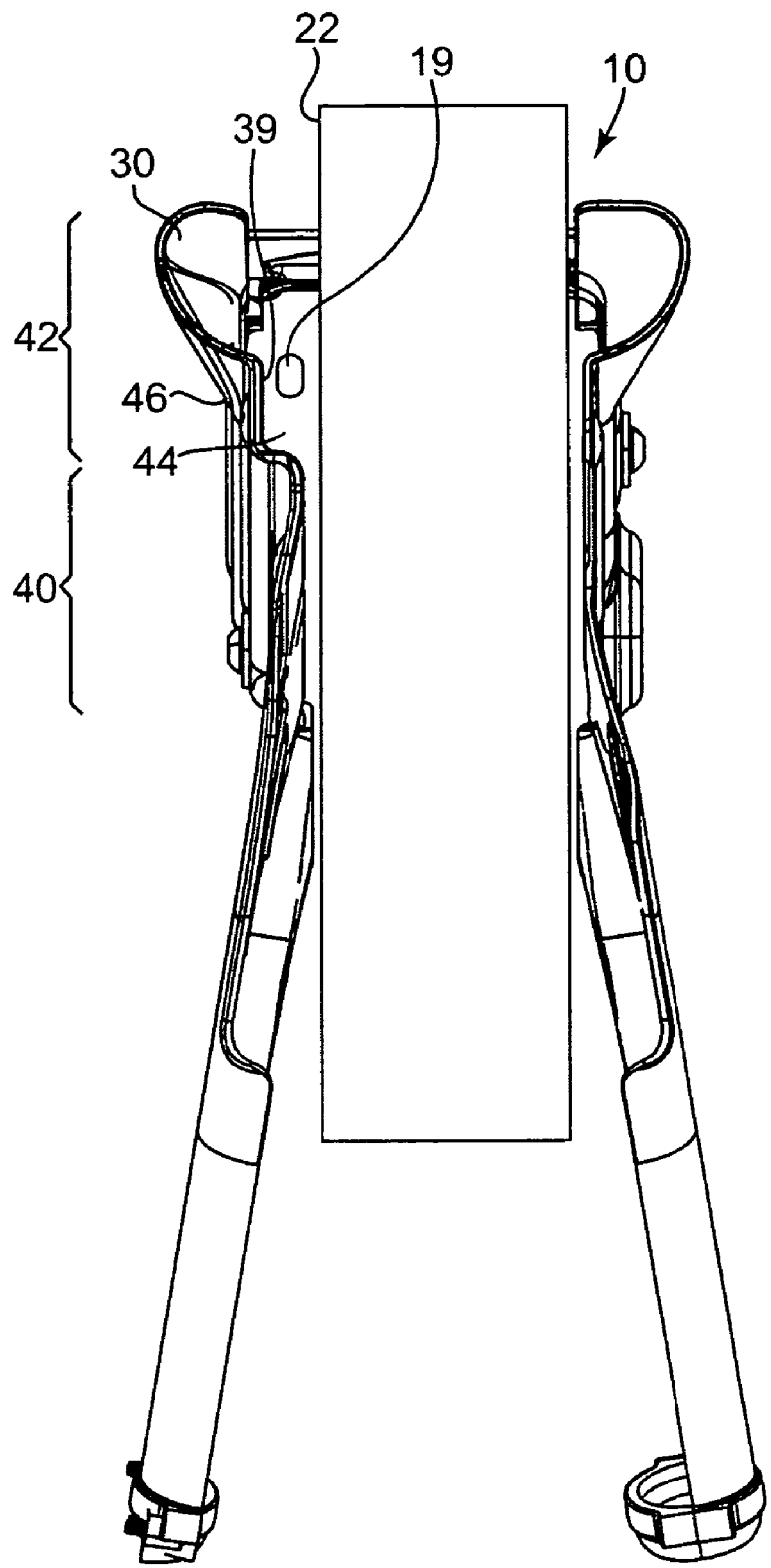
FIG. 3 is a partial front view of the frame neck of FIG. 2 with the front fork removed.

As shown in FIG. 3, on the right side cover 30, the upper portion 34 comprises a generally planar wall that in one embodiment is stepped such that the inner surface 39 of a first portion 40 is spaced from outer surface 22 of first member 11 by a first distance, and inner surface 39 of a second portion 42 is spaced from the outer surface 22 of frame member 11 by a second distance greater than the first distance. The greater spacing of second portion 42 relative to outer surface 22 defines a cavity 44 for one or more wire harnesses 19 that are typically routed along the outer surface 22 of neck 10. Cover 30 thus substantially improves the aesthetics of the neck region of a motorcycle. In the process, however, it has been found that when the fork tubes of the front fork assembly are fitted with a decorative shroud, the shroud can make contact with the outer surface 46 of second portion 42 when the front wheel is turned to an extreme angle.

Figure 4:
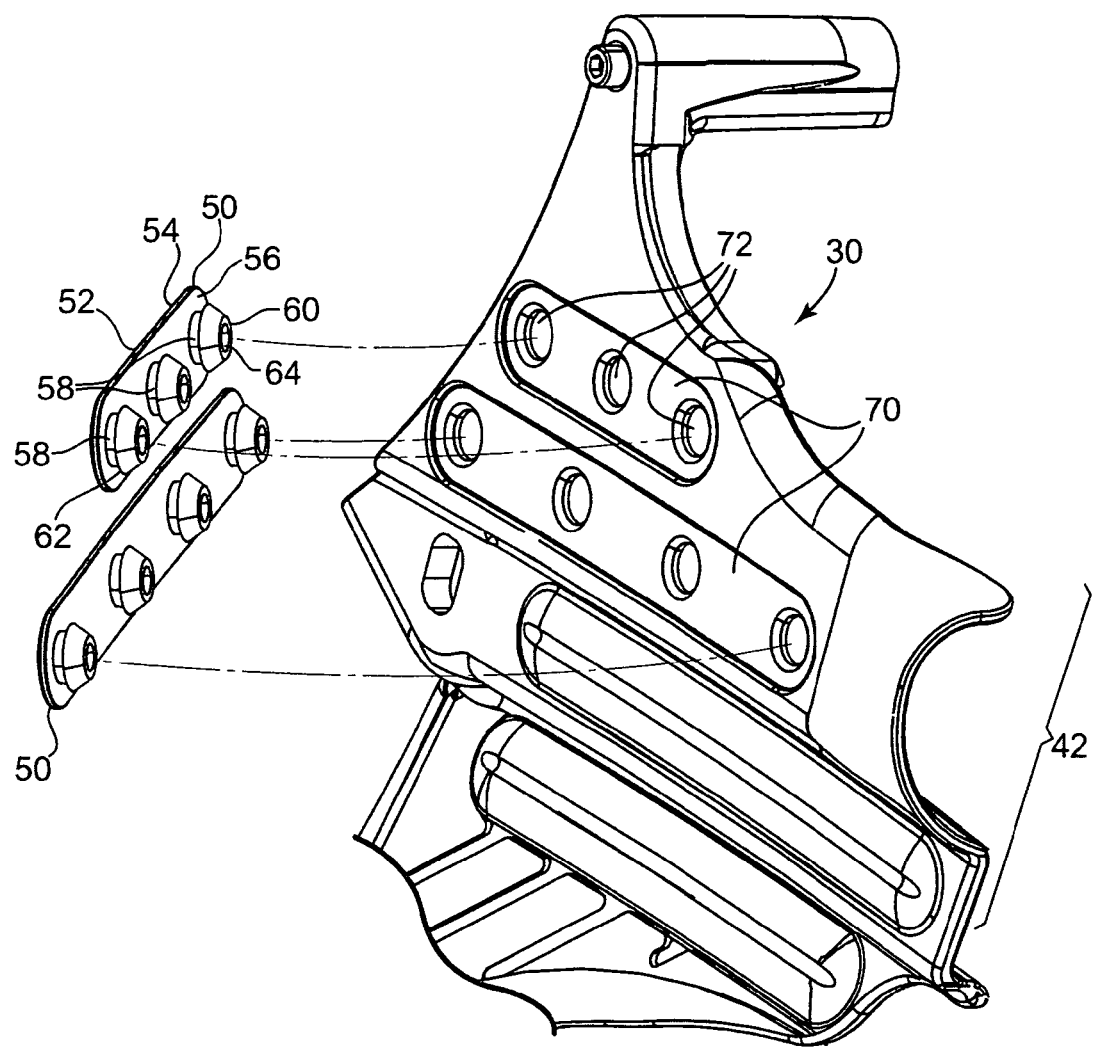
FIG. 4 is an exploded partial perspective view of the neck cover of FIG. 2 with rubber elements rotated away from their mounting site.

To prevent denting or chipping of the chrome plating on either cover 30 or the fork tube shroud, as shown in FIG. 4, the outer surface 46 of second portion 42 of cover 30 is configured with one or more strips 50 of a resilient material, such as rubber or a low durometer polymer, that extend along outer surface 46 in a region of potential contact with a fork tube shroud. In one embodiment, strip 50 comprises a generally planar wall having a perimeter 52, an outer surface 54 and an inner surface 56. Perimeter 52 may have any shape. In one embodiment, extending generally perpendicular from the inner surface 56 are one or more protrusions 58 each of which terminate with a generally conical nipple 60 having a base 62 connected to the protrusion 58, and having a tip 64. The base 62 of each nipple 60 has a diameter that is greater than a diameter of each protrusion 58.

The outer surface 46 of second portion 42 may be configured with recessed zones 70 having a shape complimentary to the shape of the perimeter 52 of strips 50. Each zone 70 further is configured with one or more through holes 72 that are complimentary to the location of protrusions 58. Holes 72 have a diameter smaller than the base 62 of nipples 60. Strip 50 is attached to cover 30 by applying pressure to the outer surface 54 of strip 50 in the vicinity of each nipple 60. Due to the resiliency of the material, base 62 deforms sufficient to pass through hole 72 and secure the strip to the second portion 42. The wall thickness of each strip 50 is selected so that the outer surface 54 of each strip is elevated above the outer surface 46 of second portion 42, which ensures that a fork tube shroud of the front fork assembly makes contact with the strip 50 and not the outer surface 46 of second portion 42. Strips 50 can also be removed from second portion 42 with adequate pulling force to cause nipples 60 to deform and pass through holes 72 to allow different strips to be installed. In one embodiment, strips 50 may comprise LED lights at the outer surface 54 with a lead wire that extends from the tip 64 of a nipple 60 to connect to an electrical source on the motorcycle. In another alternate embodiment, strips 50 can be secured to the outer surface 46 with a suitable adhesive.

Although specific embodiments have been illustrated and described herein, it will be appreciated by those of ordinary skill in the art that a variety of alternate and/or equivalent implementations may be substituted for the specific embodiments shown and described without departing from the scope of the present invention. Therefore, it is intended that this invention be limited only by the claims and the equivalents thereof.

What is claimed is:

1. A cover for a motorcycle frame neck region having a frame member configured to mount a fork assembly and first and second frame legs connected to and extending downwardly from the frame member, the cover comprising:

a generally planar wall configured for connection to the frame member, the wall substantially covering an outer surface of the frame member and having an inner surface and an outer surface, a first portion of the wall spaced a first distance from an outer surface of the frame member, a second portion of the wall spaced a second distance from the outer surface of the frame member, the second distance being greater than the first distance, the outer surface of the second portion comprising one or more resilient strips, the resilient strips extending above the outer surface of the second portion.

2. A cover for a motorcycle frame neck region having a generally rectangular tubular frame member configured to mount a fork assembly and first and second frame legs connected to and extending downwardly from the generally rectangular tubular frame member, the cover comprising:

a first semi-tubular portion configured to substantially surround a front half of the first frame leg, the first portion having a first end configured for connection to the first frame leg and a second end;

a second generally planar portion connected to and extending from the second end of the first portion, the second portion configured for connection to the generally rectangular tubular frame member, the second portion substantially covering an outer surface of the rectangular tubular frame member and having an inner surface and an outer surface, a portion of the second portion comprising one or more resilient strips along the outer surface, the resilient strips extending above the outer surface.

* * * * *